(12) United States Patent  
Fujita

(10) Patent No.: US 12,288,467 B2
(45) Date of Patent: Apr. 29, 2025

(54) COLLISION AVOIDANCE SYSTEM AND VEHICLE EQUIPPED WITH IT

(71) Applicant: RENESAS ELECTRONICS CORPORATION, Tokyo (JP)

(72) Inventor: Suguru Fujita, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 231 days.

(21) Appl. No.: 17/948,788

(22) Filed: Sep. 20, 2022

(65) Prior Publication Data

US 2023/0141817 A1 May 11, 2023

(30) Foreign Application Priority Data

Nov. 9, 2021 (JP) .................. 2021-182267

(51) Int. Cl.
| | |
|---|---|
| *G08G 1/16* | (2006.01) |
| *G06V 20/58* | (2022.01) |
| *H04W 4/46* | (2018.01) |
| *H04W 4/90* | (2018.01) |

(52) U.S. Cl.
CPC ............ *G08G 1/163* (2013.01); *G06V 20/58* (2022.01); *G08G 1/166* (2013.01); *H04W 4/46* (2018.02); *H04W 4/90* (2018.02); *G06V 2201/08* (2022.01)

(58) Field of Classification Search
CPC ......... G08G 1/163; G08G 1/166; H04W 4/46; H04W 4/90; G06V 20/58
USPC ....................................................... 701/301
See application file for complete search history.

(56) References Cited

U.S. PATENT DOCUMENTS

| | | | |
|---|---|---|---|
| 10,573,182 B2* | 2/2020 | Yang | G08G 5/0078 |
| 2022/0019813 A1* | 1/2022 | Satoh | G08G 1/166 |
| 2022/0308210 A1* | 9/2022 | Okabe | G01S 15/12 |
| 2023/0001854 A1* | 1/2023 | Bruflodt | B60R 1/23 |
| 2023/0038578 A1* | 2/2023 | Hotson | G06V 20/64 |
| 2023/0073966 A1* | 3/2023 | Caveney | B60W 50/0097 |

FOREIGN PATENT DOCUMENTS

| | | | | |
|---|---|---|---|---|
| EP | 1796268 A1 * | 6/2007 | ......... | H04B 1/71635 |
| EP | 2216950 A1 * | 8/2010 | ......... | H04L 25/0224 |
| JP | 2012-226635 A | 11/2012 | | |
| JP | 2020-129336 A | 8/2020 | | |

OTHER PUBLICATIONS

Office Action dated Jan. 14, 2025, from corresponding Japan Patent Application No. 2021-182267, 8 pages.

* cited by examiner

*Primary Examiner* — Tuan C To
(74) *Attorney, Agent, or Firm* — Rimon P.C.

(57) ABSTRACT

A collision avoidance system includes a periphery monitoring system which detects vehicles in proximity to a subject vehicle by use of a sensor, an approaching vehicle notifying system which communicates with another vehicle in proximity to the subject vehicle in vehicle-to-vehicle communication, and a detected vehicle comparison/determination system which is connected to the periphery monitoring system and the approaching vehicle notifying system, determines common vehicles detected by both the periphery monitoring system and the approaching vehicle notifying system, and controls the periphery monitoring system and the approaching vehicle notifying system.

13 Claims, 16 Drawing Sheets

COLLISION AVOIDANCE SYSTEM AND VEHICLE EQUIPPED WITH IT

CROSS-REFERENCE TO RELATED APPLICATION

The disclosure of Japanese Patent Application No. 2021-182267 filed on Nov. 9, 2021, including the specification, drawings and abstract is incorporated herein by reference in its entirety.

BACKGROUND

The present invention relates to a collision avoidance system and a vehicle equipped with it, and for example, a collision avoidance system including a periphery monitoring system which detects a vehicle in proximity to a subject vehicle by monitoring a periphery of the subject vehicle by use of a sensor and an approaching vehicle notifying system which detects a vehicle in proximity to the subject vehicle by use of vehicle-to-vehicle communication, and a vehicle equipped with it.

There are disclosed techniques listed below.
[Patent Document 1] Japanese Unexamined Patent Application Publication No. 2012-226635

For example, Patent Document 1 discloses a technology of preventing a collision of a vehicle. Patent Document 1 discloses an anticollision safety device capable of saving power consumption without impairing an anticollision function.

The periphery monitoring system uses a radar using a camera or a radio wave, for example, and receives a video of a vehicle approaching a subject vehicle or a reflected radio wave, thereby detecting a presence of a vehicle in proximity to the subject vehicle, and a distance between the subject vehicle and the vehicle in proximity thereto to notify a driver of the subject vehicle of these pieces information. Also, the approaching vehicle notifying system performs a wireless communication (vehicle-to-vehicle communication) between a subject vehicle and another vehicle, for example, communicating their locations with each other, calculating a distance between the subject vehicle and a vehicle in proximity thereto on the basis of the obtained location information, and then notifying the driver of the subject vehicle of the calculated distance.

The periphery monitoring system can sense a vehicle only in a case in which the vehicle is present in a range in which a sensor can sense the vehicle. Conversely, in the periphery monitoring system, it is difficult to sense a vehicle that is present outside the range in which the sensor can sense the vehicle. Moreover, a vehicle is detected by processing a video captured by the sensor or processing a reflected wave received by the sensor, thereby requiring time for detection of a vehicle.

In contrast, the approaching vehicle notifying system performs vehicle-to-vehicle communication between the subject vehicle and vehicles in and out of the range in which the sensor can sense the vehicles, thereby calculating a distance between the subject vehicle and a vehicle that is present in or beyond a line of sight of the subject vehicle, so that the approaching vehicle notifying system can notify the driver of the calculated distance. However, the approaching vehicle notifying system has an upper limit of the number of devices (the number of vehicles) capable of establishing vehicle-to-vehicle communication. Accordingly, for example, in a case in which the number of vehicles exceeding the upper limit is present around the subject vehicle, a vehicle approaching the subject vehicle from a range in which the sensor cannot sense may not be detected in a period of time in which collision avoidance is possible. As a result, the notifying the driver of the presence of the approaching vehicle may be delayed.

In view of this, both the periphery monitoring system and the approaching vehicle notifying system have difficulty in avoiding a collision smoothly. Patent Document 1 described above neither states nor recognizes such problems.

SUMMARY

The typical ones of the inventions disclosed in the present application will briefly be described as follows.

Specifically, a collision avoidance system according to an embodiment includes a periphery monitoring system which detects vehicles in proximity to a subject vehicle by use of a sensor, an approaching vehicle notifying system which communicates with another vehicle in proximity to the subject vehicle in vehicle-to-vehicle communication, and a detected vehicle comparison/determination system which is connected to the periphery monitoring system and the approaching vehicle notifying system, determines common vehicles detected by both the periphery monitoring system and the approaching vehicle notifying system, and controls the periphery monitoring system and the approaching vehicle notifying system.

Other objects and novel features will become apparent from the description of the present specification and the accompanied drawings.

According to one embodiment, it is possible to provide a collision avoidance system capable of enhancing an accuracy of detecting a vehicle that needs collision avoidance.

BRIEF DESCRIPTIONS OF THE DRAWINGS

FIG. 1 is a block diagram showing a configuration of a collision avoidance system according to a first embodiment.
FIG. 2 is a diagram describing the collision avoidance system according to the first embodiment.
FIG. 3 is a diagram describing the collision avoidance system according to the first embodiment.
FIG. 4 is a diagram describing the collision avoidance system according to a modification of the first embodiment.
FIG. 5 is a diagram showing a state of communication packets received from and transmitted to other vehicles in vehicle-to-vehicle communication.
FIG. 6 is a diagram showing a configuration of communication packets according to the first embodiment.
FIG. 7 is a block diagram showing a configuration of a collision avoidance system according to a second embodiment.
FIG. 8 is a diagram describing the collision avoidance system according to the second embodiment.
FIG. 9 is a diagram showing a communication packet according to the second embodiment.
FIG. 10 is a diagram describing the collision avoidance system according to the second embodiment.
FIG. 11 is a diagram describing the collision avoidance system according to the second embodiment.
FIG. 12 is a block diagram showing a configuration of a collision avoidance system according to a third embodiment.
FIG. 13 is a diagram describing the collision avoidance system according to the third embodiment.
FIG. 14 is a diagram describing the collision avoidance system according to the third embodiment.

DETAILED DESCRIPTION

Figure 1:
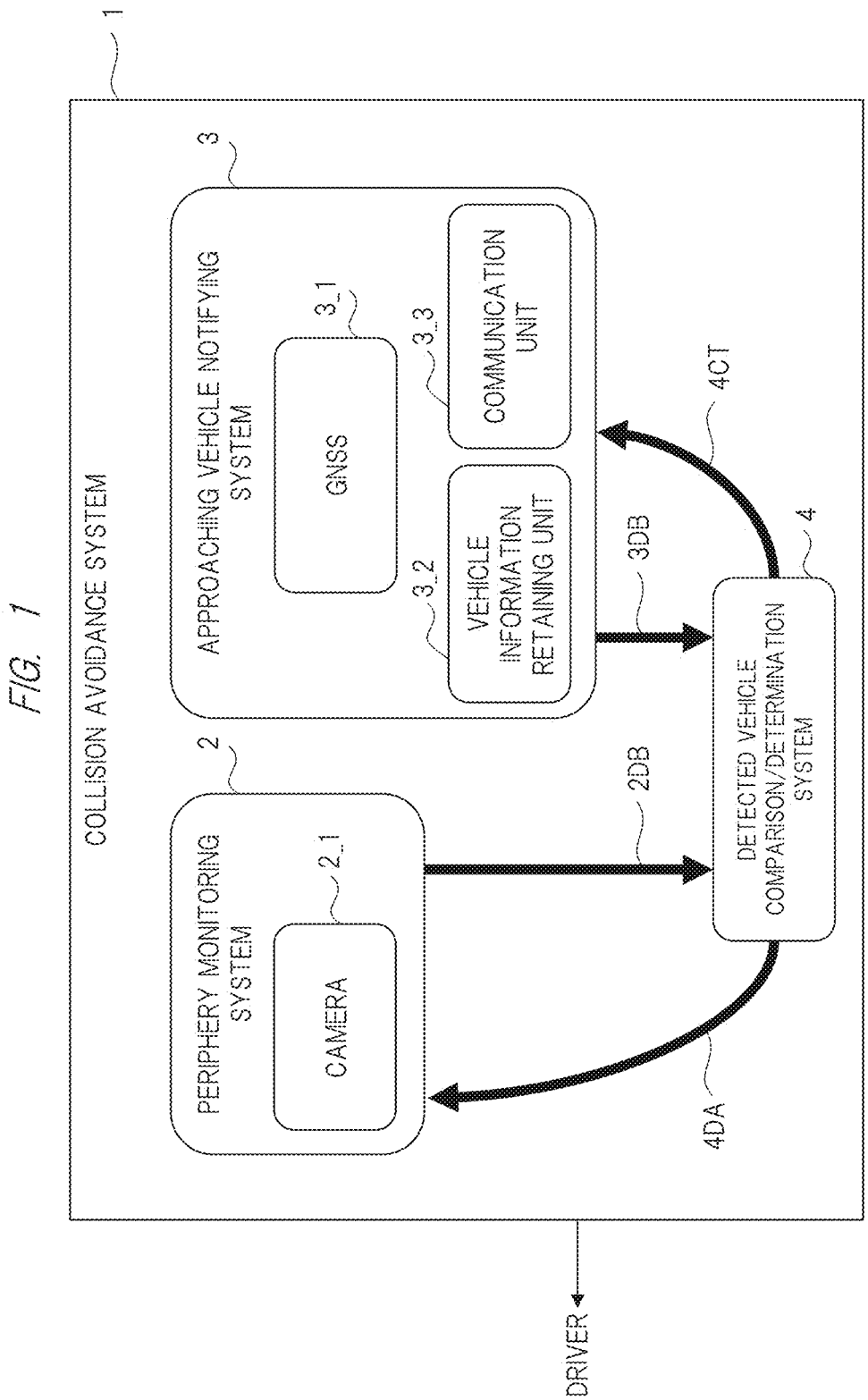

Hereinafter, embodiments of the present invention will be described with reference to the accompanying drawings. Note that this disclosure is an example only and suitable modifications which can be easily conceived by those skilled in the art without departing from the gist of the present invention are included within the scope of the invention as a matter of course.

In addition, in this specification and the respective drawings, the same components described in the drawings which have been described before are denoted by the same reference signs, and detailed description thereof may be omitted as needed.

First Embodiment

Figure 17:
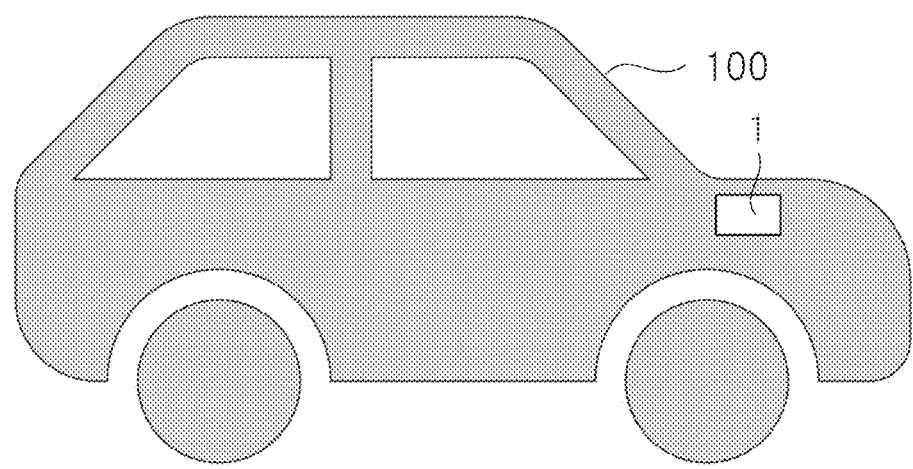
FIG. 17 is a cross-sectional view schematically showing a vehicle equipped with the collision avoidance system according to the first embodiment.

In the following description, a collision avoidance system mounted in a vehicle will be described by way of example, but the present invention is not limited to this. FIG. 17 is a cross-sectional view schematically showing a vehicle equipped with the collision avoidance system according to the first embodiment. In FIG. 17, "100" denotes a vehicle. As the vehicle, automobile is taken as an example, but the present invention is not limited to this. Also, "1" denotes a collision avoidance system mounted in the vehicle 100. The collision avoidance system 1 detects a vehicle in proximity to the vehicle 100 and notifies the driver (not illustrated) of the vehicle 100 of the detected vehicle. The driver who has received the notification operates the vehicle 100 in such a manner as to avoid a collision with the vehicle having been notified to the driver, for example. In this case, an example in which the collision avoidance system 1 notifies the driver of the subject vehicle of a vehicle in proximity to the subject vehicle will be described, but the present invention is not limited to this. For example, it may be configured such that notification from the collision avoidance system 1 is given to the vehicle 100 and the vehicle 100 can act in such a manner as to avoid a collision automatically.

Configuration of Collision Avoidance System

FIG. 1 is a block diagram showing a configuration of a collision avoidance system according to the first embodiment. FIG. 1 shows the collision avoidance system 1. The collision avoidance system 1 includes various systems, and in FIG. 1, systems required in the following description only are depicted.

The collision avoidance system 1 in FIG. 1 includes a periphery monitoring system 2, an approaching vehicle notifying system 3, and a detected vehicle comparison/determination system 4. The periphery monitoring system 2 includes a sensor to be used for detecting a vehicle that is present in a detection range. In FIG. 1, as the sensor, a camera 2_1 is illustrated as an example. The periphery monitoring system 2 performs image processing on a video captured by the camera 2_1, thereby detecting a vehicle that is present in the detection range to obtain information on the detected vehicle. The detected vehicle is a vehicle captured by the camera 2_1, and hereinafter, the vehicle detected by the periphery monitoring system 2 is referred to as a in-detection-range vehicle or a line-of-sight vehicle. Note that a vehicle that has not been captured by the camera 2_1 is referred to as a out-of-detection range vehicle or a beyond-line-of-sight vehicle. The information on the detected vehicle includes, for example, distance information between the detected vehicle and the subject vehicle, a moving direction and an exterior shape of the detected vehicle, and the like, and is output to the detected vehicle comparison/determination system 4 as detected vehicle information 2DB.

The approaching vehicle notifying system 3 includes Global Navigation Satellite System (hereinafter, also referred to as GNSS) 3_1, a vehicle information retaining unit 3_2, and a communication unit 3_3. The approaching vehicle notifying system 3 obtains location information on the subject vehicle 100 (FIG. 17), topographical information on the surroundings of the subject vehicle, and the like, by the GNSS 3_1. In addition, the approaching vehicle notifying system 3 performs vehicle-to-vehicle communication between the subject vehicle and a vehicle that is present in a periphery of the subject vehicle via the communication unit 3_3. Then, the approaching vehicle notifying system 3 receives information on the vehicle that is present in the periphery of the subject vehicle, for example, information such as location information, a heading direction, and a vehicle type of the vehicle that is present in the periphery of the subject vehicle, and transmits information such as location information, a heading direction, and a vehicle type of the subject vehicle. The received (obtained) location information, heading direction, vehicle type of the vehicle, and the like are retained in the vehicle information retaining unit 3_2. Note that the information on the subject vehicle 100 obtained by the GNSS 31 may also be retained in the vehicle information retaining unit 3_2. The approaching vehicle notifying system 3 outputs the vehicle information retained in the vehicle information retaining unit 3_2, as detected vehicle information 3DB, to the detected vehicle comparison/determination system 4.

The detected vehicle comparison/determination system 4 compares the detected vehicle information 2DB with the detected vehicle information 3DB. That is, the detected vehicle comparison/determination system 4 compares vehicles indicated by the detected vehicle information 2DB with vehicles indicated by the detected vehicle information 3DB. As a result of this comparison, for example, common vehicles that have been detected by both the periphery monitoring system 2 and the approaching vehicle notifying system 3, that is, common vehicles that are indicated by both pieces of the detected vehicle information 2DB and 3DB are determined. The detected vehicle comparison/determination system 4 according to the first embodiment extracts vehicles excluding the common vehicles from the vehicles detected by the approaching vehicle notifying system 3, that is, the vehicles indicated by the detected vehicle information 3DB, and on the basis of information regarding the extracted vehicles, controls the periphery monitoring system 2 and the approaching vehicle notifying system 3.

More specifically, information on the vehicles obtained by excluding the common vehicles detected by both of the systems from the vehicles detected by the approaching vehicle notifying system 3, that is, information on the vehicles that is not indicated by the detected vehicle information 2DB but indicated only by the detected vehicle information 3DB is notified, as detection area information 4DA, to the periphery monitoring system 2. In other words, the detection area information 4DA includes information on vehicles that can perform vehicle-to-vehicle communication and are present beyond the line of sight of the subject vehicle.

Also, the detected vehicle comparison/determination system 4 notifies the approaching vehicle notifying system 3 of the information on the vehicles that are not indicated by the detected vehicle information 2DB but are indicated only by the detected vehicle information 3DB, as communication target information 4CT. In other words, in the first embodiment, the detection area information 4DA is notified, as the communication target information 4CT, to the approaching vehicle notifying system 3. As a matter of course, the present invention is not limited to this. For example, the information on the common vehicles detected by both systems may be configured to be output, as the communication target information 4CT, by the detected vehicle comparison/determination system 4. In this case, in the approaching vehicle notifying system 3, from the information on the vehicles retained in the vehicle information retaining unit 3_2, the information on the common vehicles indicated by the communication target information 4CT is eliminated.

The periphery monitoring system 2 is controlled on the basis of the detection area information 4DA, and the approaching vehicle notifying system 3 is controlled on the basis of the communication target information 4CT. Next, with use of a specific example, an operation of the collision avoidance system 1 will be described.

Operation of Collision Avoidance System
Example of Traveling State of Vehicle

Figure 2:
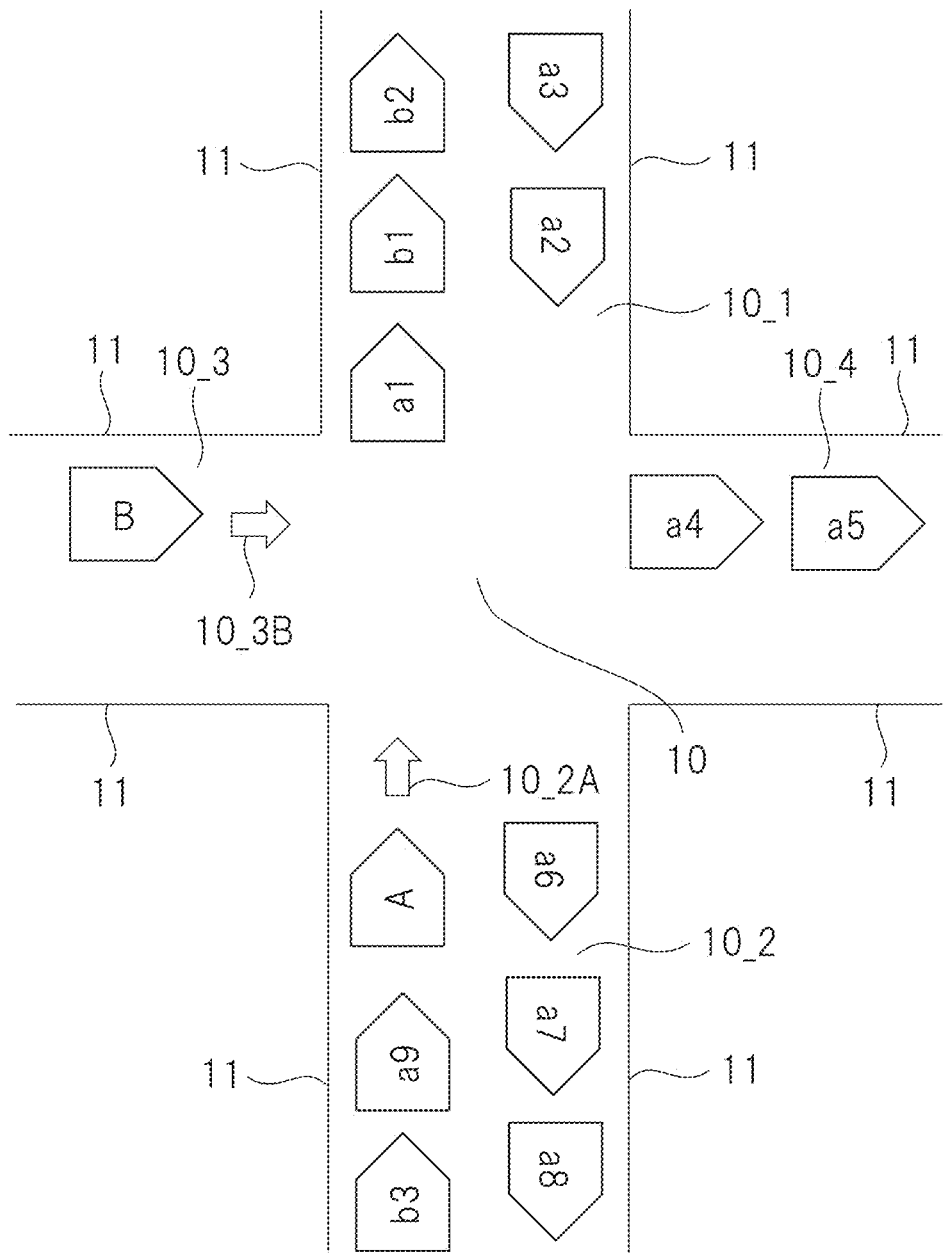

An example when a plurality of vehicles are travelling on a road is indicated, and an operation of the collision avoidance system at this time will be described. FIG. 2 is a diagram describing the collision avoidance system according to the first embodiment. In FIG. 2, reference signs 10_1 to 10_4 represent roads, and the roads 10_1 to 10_4 intersect with each other at a crossroads 10. In addition, a reference sign 11 represents walls provided along the roads 10_1 to 10_4. In FIG. 2, a home-plate-shaped pentagon represents a vehicle. Reference signs A, a1 to a9, B, and b1 to b3 in the respective pentagons are reference signs for vehicles. Also, in each of the pentagons, a direction in which a vertex of a triangle formed by two long sides faces indicates a heading direction of each of the vehicles.

More specifically, on the road 10_1, the vehicles a1 to a3 and the vehicles b1 and b2 are present. The vehicles a2 and a3 travel in a direction heading to the crossroads 10, and the vehicles a1, b1, and b2 travel in a direction away from the crossroads 10. Also, the vehicles A, a9, and b3 and the vehicles a6 to a8 are present on the road 10_2. The vehicles A, a9, and b3 travel in a direction 10_2A heading to the crossroads 10, and the vehicles a6 to a8 travel in a direction away from the crossroads 10. Also, on the road 10_3, the vehicle B is present and travels in a direction 10_3B heading to the crossroads 10. The vehicles a4 and a5 are present on the road 10_4 and travel in a direction away from the crossroads 10.

In this case, although there is no particular limitation, all the vehicles A, a1 to a9, B, and b1 to b3 are assumed to be equipped with the collision avoidance system 1 indicated in FIG. 1. Also, the subject vehicle (first vehicle) is assumed to be a vehicle denoted by the reference sign A. Since the walls 11 are provided along the roads 10_2 and 10_3, a driver of the subject vehicle A cannot visually recognize the vehicle (second vehicle) B. That is, since the vehicle B is obscured by the walls 11, the vehicle B is present beyond the line of sight of the subject vehicle A (out of the detection range of the sensor). Similarly, the subject vehicle A is present beyond the line of sight of the vehicle B. In FIG. 2, the vehicles that are present beyond the line of sight of the subject vehicle A are denoted by the reference signs b1 to b3. Note that, since other vehicles are present between each of the vehicles b1 to b3 and the subject vehicle A, the driver of the subject vehicle A cannot visually recognize the vehicles b1 to b3. Hence, the vehicles b1 to b3 are present beyond the line of sight of the subject vehicle A. In addition, in FIG. 2, the vehicles that are present in the line of sight of the subject vehicle A (in the detection range of the sensor) are denoted by the reference signs a1 to a9.

A description will be given by taking the collision avoidance system 1 incorporated in the subject vehicle A as an example. In the example indicated in FIG. 2, as described above, the vehicles a1 to a5 are present in the line of sight of the subject vehicle A, and the vehicles B and b1 to b3 are present beyond the line of sight of the subject vehicle A. Accordingly, the detected vehicle information 2DB output from the periphery monitoring system 2 includes vehicle information on the vehicles a1 to a5. Meanwhile, the detected vehicle information 3DB output from the approaching vehicle notifying system 3 includes the vehicle information on the vehicles a1 to a9, B, and b1 to b3 that are present in the periphery of the subject vehicle A (in and beyond the line of sight of the subject vehicle A).

The detected vehicle comparison/determination system 4 determines common vehicles between pieces of the detected vehicle information 2DB and 3DB. Moreover, the detected vehicle comparison/determination system 4 generates detection area information 4DA and communication target information 4CT on the basis of the vehicle information excluding the common vehicle information from the vehicle information indicated by the detected vehicle information 3DB. That is, the detected vehicle comparison/determination system 4 outputs the detection area information 4DA and the communication target information 4CT on the basis of the vehicle information detected only by the approaching vehicle notifying system 3. Accordingly, in the example of FIG. 2, the detection area information 4DA and the communication target information 4CT that are generated on the basis of the vehicle information on the vehicles B and b1 to b3 are output to the periphery monitoring system 2 and the approaching vehicle notifying system 3, respectively.

Periphery Monitoring System

The periphery monitoring system 2 determines the vehicles indicted by the received detection area information 4DA as vehicles that need more attention. Moreover, the periphery monitoring system 2 determines the vehicle to be watched among the vehicles that need more attention, and performs a process according to the vehicle to be watched.

The periphery monitoring system 2 cannot detect the vehicles b1 and b2 since they are not visible behind the vehicle a1. Similarly, the periphery monitoring system 2 cannot detect the vehicle b3 that is not visible behind the succeeding vehicle a9, and cannot detect the vehicle B that is present ahead to the left and is not visible behind the wall 11. Accordingly, the periphery monitoring system 2 recognizes, on the basis of the detection area information 4DA, presence of the vehicles b1 to b3, and B that cannot be detected by the periphery monitoring system 2, that is, presence of the beyond-line-of-sight vehicles, and determines that these beyond-line-of-sight vehicles need more attention. Further, the periphery monitoring system 2 can determine, from the detected vehicle information 2DB detected by itself and the detection area information 4DA notified from the detected vehicle comparison/determination system 4, that there are present other vehicle a1 and a9 between the vehicles b1, b2, and b3 that need more attention and the subject vehicle A. More specifically, the periphery monitoring system 2 can determine that there is another vehicle a1 between the vehicles b1 and b2 that are located ahead of the subject vehicle A and the subject vehicle A and that there is another vehicle a9 between the vehicle b3 that is located in the rear of the subject vehicle A and the subject vehicle A. Hence, the periphery monitoring system 2 determines that these vehicles b1, b2 and b3 do not need to be watched immediately. In contrast, the periphery monitoring system 2 determines that, since there is no other vehicle between the vehicle B and the subject vehicle A, the vehicle B is a vehicle that needs to be watched for avoiding a possible collision.

Figure 3:
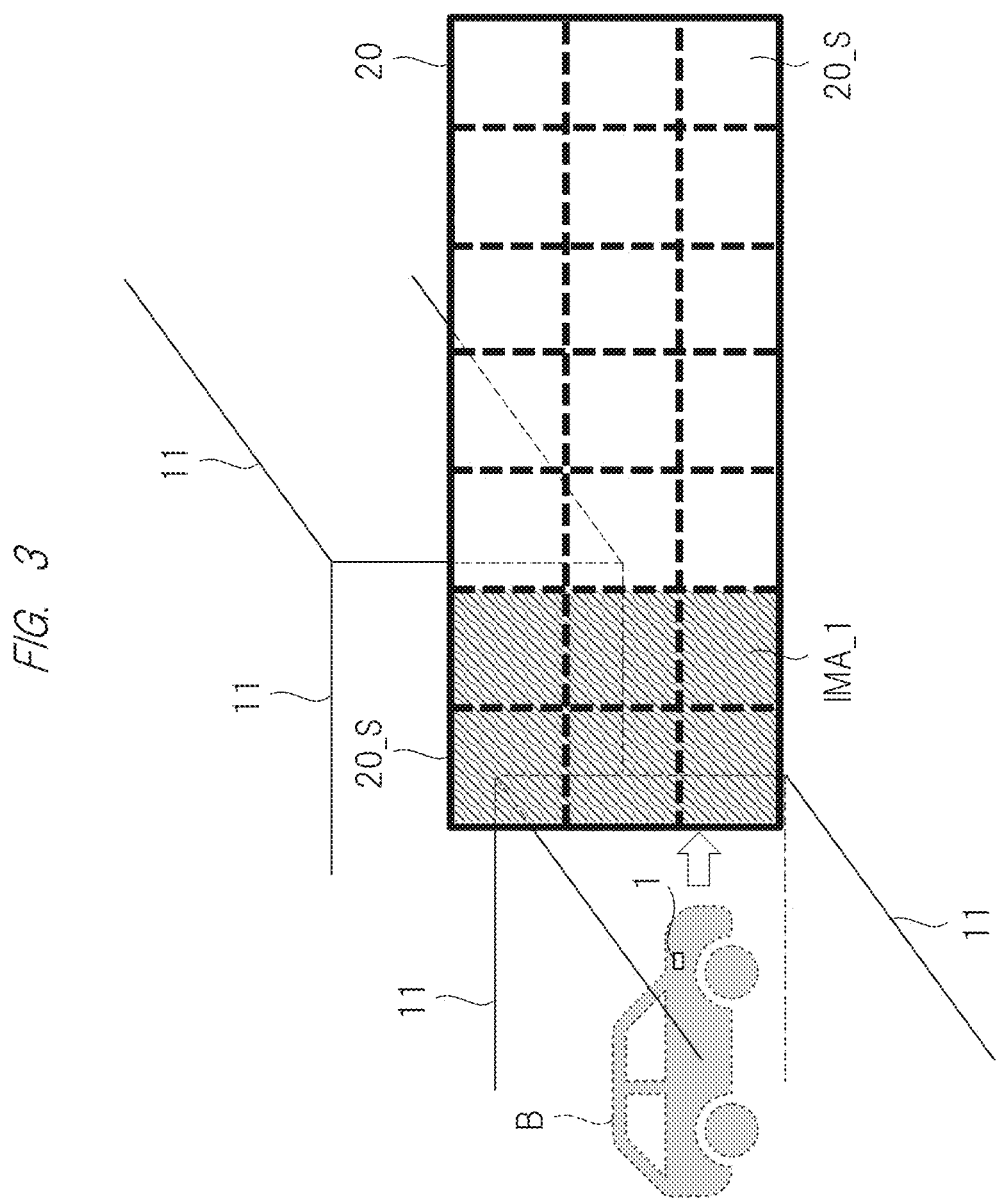

Next, a method of detecting the vehicle B to be watched by the periphery monitoring system 2 will be described with reference to the drawing. FIG. 3 is a diagram describing the collision avoidance system according to the first embodiment. Here, the camera 2_1 indicated in FIG. 1 is assumed to be a camera capturing a video of the front of the subject vehicle A. In FIG. 3, a reference sign 20 indicates a detection range of the periphery monitoring system 2.

The periphery monitoring system 2 divides a video of the detection range 20 in a video obtained by capturing, into a plurality of processing ranges 20_S (in FIG. 3, 7×3=21), and such image processing as to extract a moving object such as a vehicle is performed on each divided processing range 20_S. Normally, divided processing ranges 20_S are sequentially subjected to image processing. For example, in the detection range 20, image processing is carried out in such a manner as to scan from the processing range 20_S in the left uppermost stage to the processing range 20_S in the right lowermost stage. Hence, a time is required for detection of an object in the detection range 20.

According to the first embodiment, on the basis of the detection area information 4DA, the information on the vehicle B is notified to the periphery monitoring system 2. According to this notification, the periphery monitoring system 2 can recognizes that there is the vehicle B, though being invisible behind the wall 11, heading toward the crossroads 10. As a result, the periphery monitoring system 2 sets part of the video of the captured detection range 20, for example, six of the processing ranges 20_S indicated with oblique lines in FIG. 3 to a focused detection range IMA_1, and increases a frequency of image processing on the processing ranges 20_S set as the focused detection range IMA_1. As a result, it is possible to reduce a time required for detecting the vehicle B.

Note that the periphery monitoring system 2 may be configured to perform no image processing on a detection range other than the focused detection range IMA_1, but the frequency of image processing on the detection range other than the focused detection range IMA_1 is desirably lowered. The frequency of image processing is set to be low, so that other vehicles than the vehicle B can also be detected by the periphery monitoring system 2.

Modification

Figure 4:
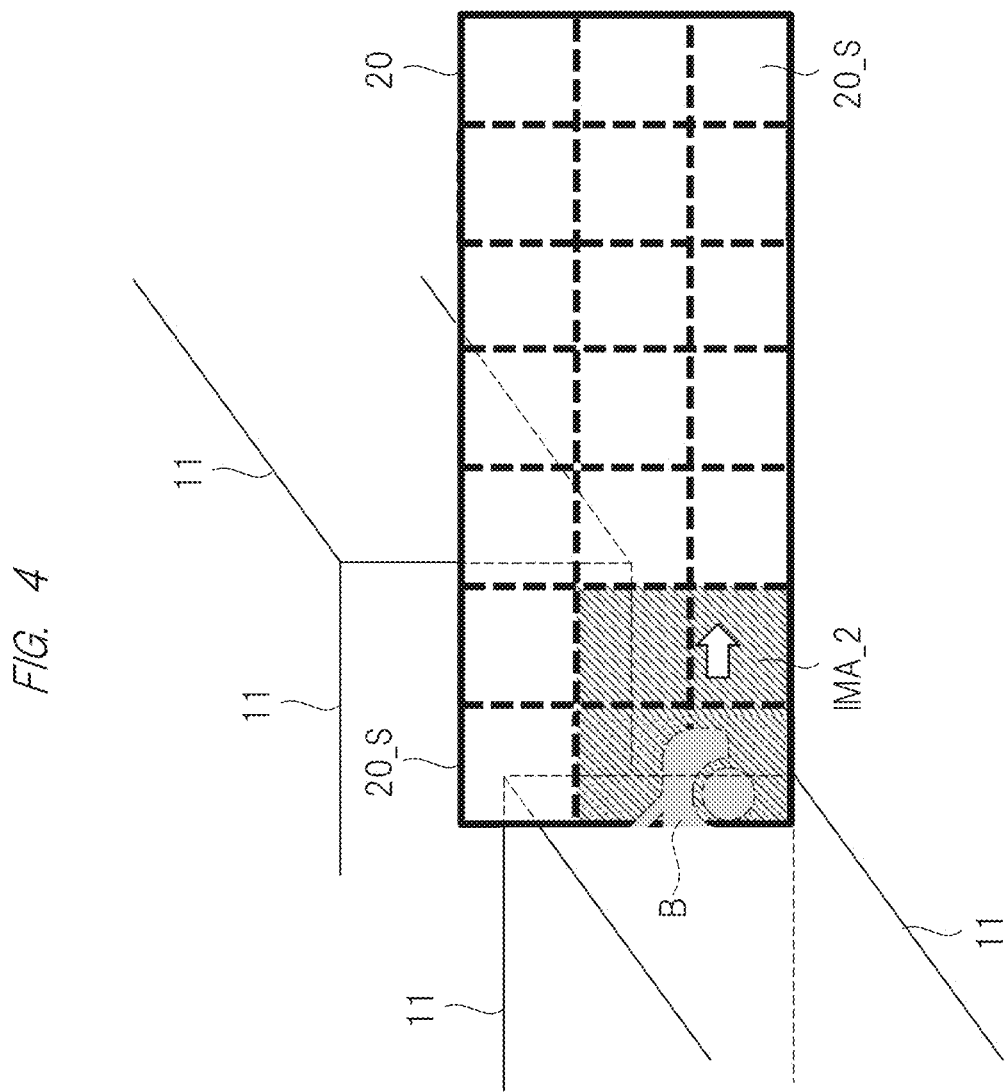

FIG. 4 is a diagram describing the collision avoidance system according to a modification of the first embodiment. In the modification, a collision avoidance system capable of further reducing a time required for detecting the vehicle B is provided.

In the collision avoidance system 1 shown in FIG. 1, information regarding a vehicle type of the vehicle B that is received in vehicle-to-vehicle communication is also stored in the vehicle information retaining unit 3_2. In the modification, the detected vehicle comparison/determination system 4 generates detection area information 4DA including vehicle type information of the vehicle B, and outputs the generated information to the periphery monitoring system 2. The periphery monitoring system 2 grasps the exterior shape of the vehicle B in advance from the vehicle type information of the vehicle B included in the detection area information 4DA, and sets the focused detection range IMA_2 according to the exterior shape of the vehicle B. In FIG. 4, a case in which the vehicle type information of the vehicle B indicates that the vehicle B is a vehicle having a low total height is indicated. Although FIG. 4 is similar to FIG. 3, since the total height of the vehicle B is low, as indicated with oblique lines, the processing ranges 20_S on the left lower side of the detection range 20 are set as the focused detection range IMA_2. Accordingly, it is possible to make the focused detection range smaller, and detecting the vehicle B in a much shorter time is enabled.

Approaching Vehicle Notifying System

Figure 5:
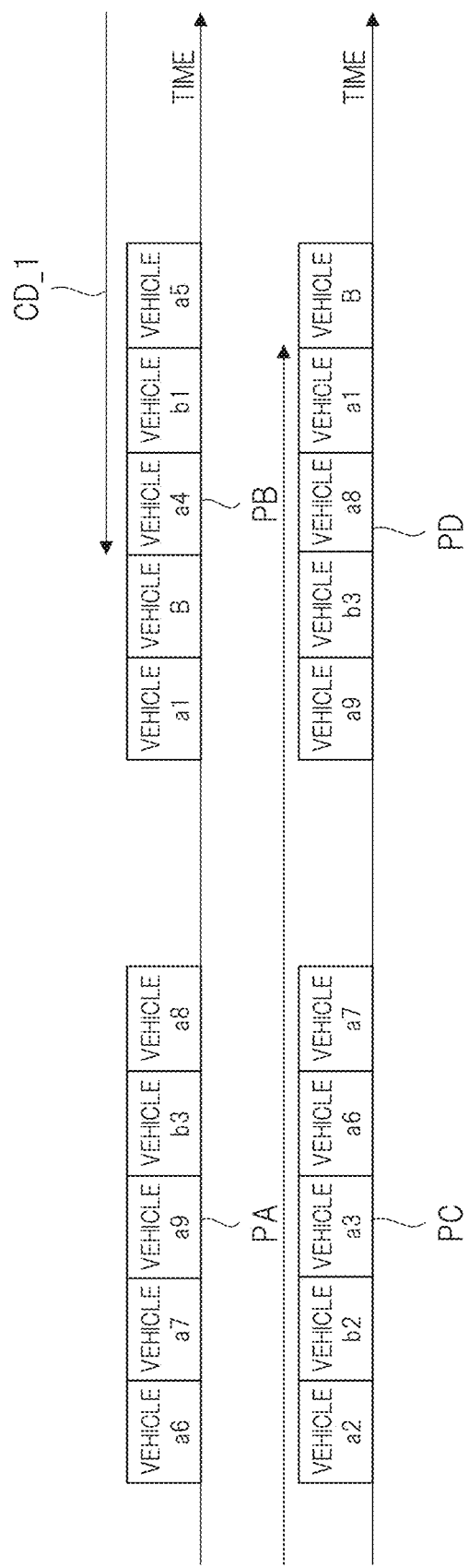

1. FIG. 5 is a diagram showing a communication state of communication packets received from and transmitted to other vehicles in vehicle-to-vehicle communication. In FIG. 5, as time elapses, receivable periods PA to PD periodically set to the subject vehicle are shown. Here, a case in which respective pieces of information on five vehicles are received in one receivable period is shown. For example, in the receivable period PA, in the order of the vehicles a6, a7, a9, b3, and a8, vehicle information is received from each vehicle.

In the receivable period, in a case in which the order of the vehicles performing vehicle-to-vehicle communication is set starting from the vehicle closer to the subject vehicle A to the vehicle farther from the subject vehicle A, the information on the vehicle B to be watched is received in the second place of the receivable period PB, and is next received in the fifth place of the receivable period PD. As a result, a communication interval with the vehicle B to be watched, as indicated in FIG. 5 becomes CD_1. That is, a reception interval of the information on the vehicle B to be watched becomes longer by a period of time according to the number of vehicles that perform vehicle-to-vehicle communication, in a case in which the vehicles detected by the approaching vehicle notifying system 3 are not changed.

The detected vehicle comparison/determination system 4 according to the first embodiment outputs, as described above, the information on the vehicle not indicated by the detected vehicle information 2DB but indicated only by the detected vehicle information 3DB, as the communication target information 4CT, to the approaching vehicle notifying system 3. In the example shown in FIG. 2, the communication target information 4CT is information on the vehicle B, b1 to b3 other than the vehicles a1 to a9.

Figure 6:
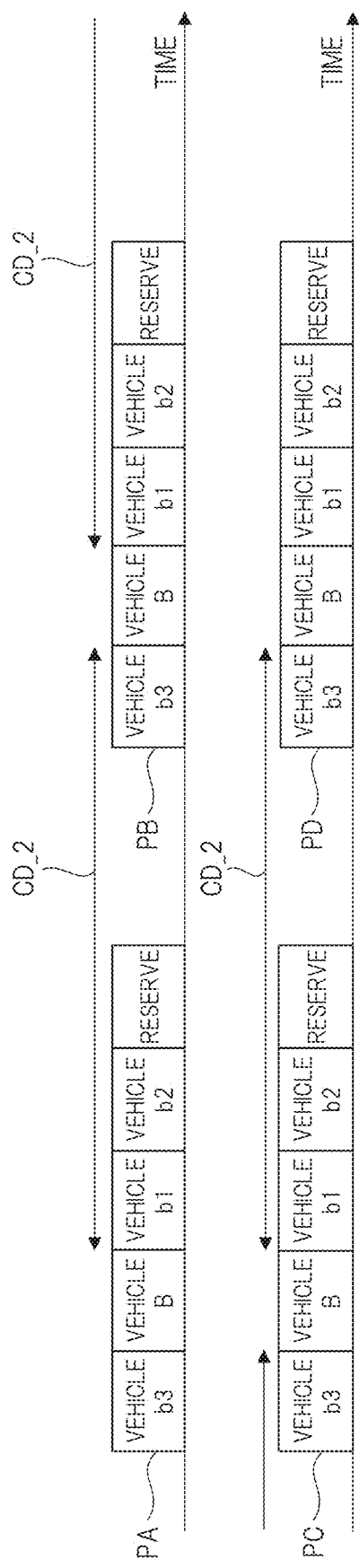

The approaching vehicle notifying system 3 performs vehicle-to-vehicle communication with the vehicles indicated by this communication target information 4CT. FIG. 6 is a diagram showing the receivable periods according to the first embodiment. Similarly to FIG. 5, FIG. 6 shows the receivable periods PA to PD set to the subject vehicle A. Also in this case, a case in which respective pieces of information on five vehicles can be received in one receivable period is indicated.

According to the communication target information 4CT, the approaching vehicle notifying system 3 performs vehicle-to-vehicle communication with four vehicles B and b1 to b3. Accordingly, respective pieces of information on four vehicles B and b1 to b3 are received in one receivable periods, and for each receivable period, it is possible to obtain pieces of information on the vehicles including the vehicle B to be watched for collision avoidance. In addition, information on the vehicle B to be watched is first stored in the second place of the receivable period PA, and then, is stored in the second place of the receivable period PB. That is, a communication interval between the subject vehicle A and the vehicle B to be watched is a period CD_2 as shown in FIG. 6, and the subject vehicle A can obtain the information on the vehicle B in a short cycle. For example, the subject vehicle A can obtain location information on the vehicle B transmitted by a communication packet from the vehicle B to be watched, in a short interval. As a result, the subject vehicle A can have the location information on the vehicle B with high accuracy.

Note that, in FIG. 6, each of the receivable periods PA to PD includes a communication period for a reserve. For example, when there is a vehicle that the periphery monitoring system 2 has not been able to detect, this reserve communication period is used for vehicle-to-vehicle communication between the vehicle and the subject vehicle A. Accordingly, it is possible to restart vehicle-to-vehicle communication between the vehicle that periphery monitoring system 2 has not been able to detect, in other words, a vehicle other than the common vehicles detected by both systems and the subject vehicle A.

According to the collision avoidance system 1 of the first embodiment, in the detected vehicle comparison/determination system 4, the detected vehicle information 2DB from the periphery monitoring system 2 and the detected vehicle information 3DB from the approaching vehicle notifying system 3 are compared with each other, and the common vehicles in both systems are determined, and a vehicle to be detected is identified for each system. For example, in the example shown in FIG. 2, the detected vehicle comparison/determination system 4 identifies the vehicle to be detected by the periphery monitoring system 2 according to the detection area information 4DA and identifies the vehicle to be detected by the approaching vehicle notifying system 3 according to the communication target information 4CT. Since a vehicle not identified according to the detection area information 4DA and the communication target information 4CT is a vehicle that is not a detection target or a vehicle that does not need attention, in a different perspective, it can be considered that the detected vehicle comparison/determination system 4 is determining which vehicle does not need to be detected for each system.

In addition, according to the collision avoidance system 1, since the vehicle as a detection target is identified for each system, it is possible to obtain the information on the vehicle that needs collision avoidance in a short period of time, allowing for smooth operation for collision avoidance.

Second Embodiment

In the second embodiment, the information on the vehicle detected by the periphery monitoring system 2 is transmitted to other vehicles, as information on the vehicle that is present beyond the line of sight (beyond-line-of-sight vehicle information), through vehicle-to-vehicle communication. By adopting such configuration, the other vehicles can avoid a possible collision with use of the beyond-line-of-sight vehicle information received through vehicle-to-vehicle communication.

Figure 7:
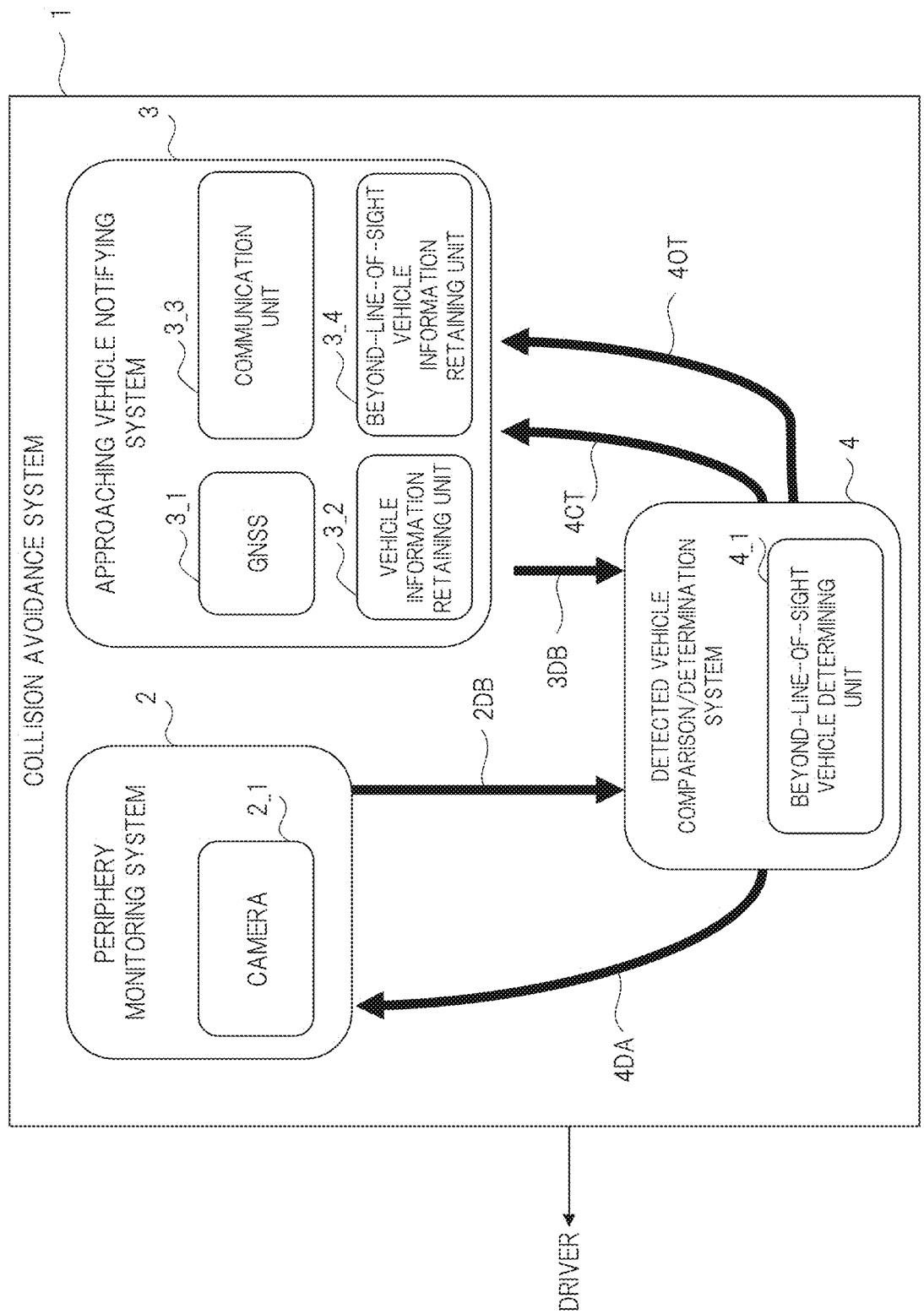

FIG. 7 is a block diagram showing a configuration of a collision avoidance system according to a second embodiment. Since FIG. 7 is similar to FIG. 1, differences will mainly be described. Main differences are as follows: the detected vehicle comparison/determination system 4 in FIG. 7 includes a beyond-line-of-sight vehicle determining unit 4_1 that outputs beyond-line-of-sight vehicle information 4OT, and the approaching vehicle notifying system 3 includes a beyond-line-of-sight vehicle information retaining unit 3_4 that retains the beyond-line-of-sight vehicle information 4OT.

The beyond-line-of-sight vehicle determining unit 4_1 receives the detected vehicle information 2DB output from the periphery monitoring system 2 and notifies the approaching vehicle notifying system 3 of information on the vehicle obtained from the detected vehicle information 2DB, for example, information such as a vehicle type, a distance, a heading direction, a speed, an exterior shape of the vehicle, as the beyond-line-of-sight vehicle information 4OT. The approaching vehicle notifying system 3 retains the notified beyond-line-of-sight vehicle information 4OT in the beyond-line-of-sight vehicle information retaining unit 3_4.

In addition, as has been described in the first embodiment, the approaching vehicle notifying system 3 obtains communication target information 4CT as vehicle information detected only by the approaching vehicle notifying system 3, from the detected vehicle comparison/determination system 4. The approaching vehicle notifying system 3 in the second embodiment transmits the communication target information 4CT to other vehicles via vehicle-to-vehicle communication, along with information on the subject vehicle. The approaching vehicle notifying system 3 of a vehicle that has received vehicle information on other vehicles, including the communication target information 4CT, via vehicle-to-vehicle communication can visually recognize that there is a vehicle of which information can be obtained only through vehicle-to-vehicle communication, for the vehicle that has received the vehicle information. In view of this, the approaching vehicle notifying system 3 of the vehicle that has received the vehicle information determines whether the information on the vehicle indicated in the received communication target information 4CT is retained in the beyond-line-of-sight vehicle information retaining unit 3_4 thereof. In a case in which the information on the vehicle indicated in the received communication target information 4CT is retained in the beyond-line-of-sight vehicle information retaining unit 3_4 thereof, the approaching vehicle notifying system 3 transmits, along with the information on the subject vehicle, the beyond-line-of-sight vehicle information 4OT via vehicle-to-vehicle communication.

Operation of Collision Avoidance System

Figure 8:
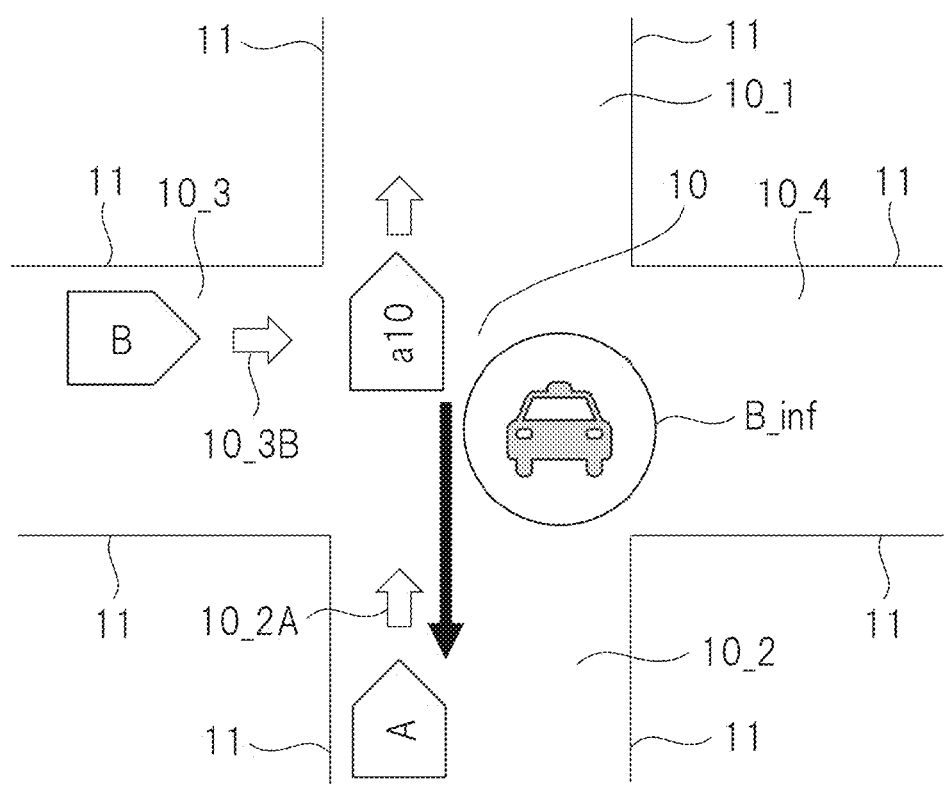

FIG. 8 is a diagram describing the collision avoidance system according to the second embodiment. FIG. 8 is similar to FIG. 2. A difference is that, in FIG. 8, the vehicles A and a10, and B only are indicated. The vehicles A and B are heading to the crossroads 10, similarly to FIG. 2. The vehicle a10 is passing the crossroads 10, in such a manner as to head to the road 10_1. Each of the vehicles A, a10 and B is assumed to be equipped with the collision avoidance system 1 shown in FIG. 7. Also, in the following description, the vehicle a10 is also referred to as a first vehicle, and the vehicle A is also referred to as a second vehicle or another vehicle.

Since the first vehicle a10 is passing the crossroads 10, the vehicle B is present in a line of sight of the first vehicle a10. Accordingly, the camera 2_1 mounted in the first vehicle a10 captures a video of the vehicle B, and the vehicle B is detected from the captured video. The information on the vehicle B is notified, as the detected vehicle information 2DB, to the detected vehicle comparison/determination system 4 of the first vehicle a10. The beyond-line-of-sight vehicle determining unit 4_1 in the detected vehicle comparison/determination system 4 of the first vehicle a10 notifies the approaching vehicle notifying system 3 of the first vehicle a10 of the detected vehicle information 2DB, as the beyond-line-of-sight vehicle information 4OT. The beyond-line-of-sight vehicle information 4OT includes information on the vehicle detected by the periphery monitoring system 2 of the first vehicle a10, for example, information such as a vehicle type of the vehicle B, a distance between the vehicle B and the first vehicle a10, a moving direction of the vehicle B, a speed of the vehicle B. Hereinafter, the information on the vehicle B included in the beyond-line-of-sight vehicle information 4OT is referred to as information B_inf. The beyond-line-of-sight vehicle information 4OT including the information B_inf is retained in the beyond-line-of-sight vehicle information retaining unit 3_4 in the approaching vehicle notifying system 3.

Meanwhile, the periphery monitoring system 2 and the approaching vehicle notifying system 3 in the collision avoidance system 1 of the second vehicle A also output respective pieces of detected vehicle information 2DB and 3DB. The detected vehicle comparison/determination system 4 of the second vehicle A generates communication target information 4CT, on the basis of the detected vehicle information 2DB and 3DB of the second vehicle A. The approaching vehicle notifying system 3 of the second vehicle A transmits the communication target information 4CT on the second vehicle A along with the information on the subject vehicle (second vehicle A), to other vehicles, via the communication unit 3_3. That is, in a situation indicated in FIG. 8, the communication target information 4CT of the second vehicle A includes the information on the vehicle B. Thus, the second vehicle A transmits the information on the subject vehicle and the information on the vehicle B that performs vehicle-to-vehicle communication but is present beyond the line of sight of the second vehicle A, as the vehicle information on the second vehicle A, to other vehicles including the first vehicle a10.

The first vehicle a10 receives the vehicle information on the second vehicle A, via vehicle-to-vehicle communication. The approaching vehicle notifying system 3 of the first vehicle a10 determines whether vehicle information included in the communication target information 4CT of the received vehicle information on the second vehicle A is included in the beyond-line-of-sight vehicle information 4OT retained in the beyond-line-of-sight vehicle information retaining unit 3_4. In FIG. 8, the beyond-line-of-sight vehicle information 4OT retained in the beyond-line-of-sight vehicle information retaining unit 3_4 of the first vehicle a10 includes the information on the vehicle B included in the received communication target information 4CT of the second vehicle A. Accordingly, the first vehicle a10 adds the beyond-line-of-sight vehicle information 4OT (information B_inf on the vehicle B) retained in the beyond-line-of-sight vehicle information retaining unit 3_4 to the information on the first vehicle a10 (information on the subject vehicle), and then transmits the beyond-line-of-sight vehicle information 4OT to the second vehicle A travelling behind the first vehicle a10 via the communication unit 3_3. That is, vehicle-to-vehicle communication between the first vehicle a10 and the second vehicle A allows the information on the vehicle B detected by the first vehicle a10 and the information on the first vehicle a10 to be transmitted to the second vehicle A.

Note that, as has been described in FIG. 2, the vehicle B is present beyond the line of sight of the vehicle A, and accordingly, the vehicle B cannot be detected by the periphery monitoring system 2 of the vehicle A. Moreover, in FIG. 8, the information B_inf exemplifies the information on the vehicle B transmitted from the first vehicle a10 to the second vehicle A through vehicle-to-vehicle communication.

Figure 9:
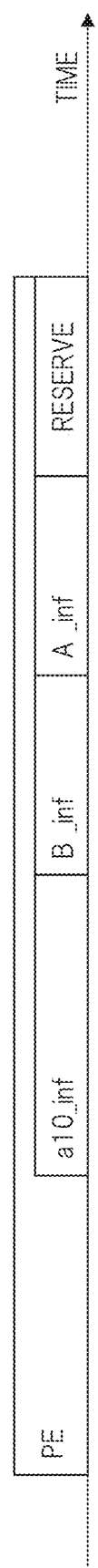

FIG. 9 is a diagram showing a communication packet according to the second embodiment. FIG. 9 shows a communication packet PE to be transmitted by the first vehicle a10. The communication packet PE includes information a10_inf on the first vehicle a10, the information B_inf on the vehicle B, information A_inf on the vehicle A, and a reserve region. The information B_inf on the vehicle B in the communication packet PE is information retained in the beyond-line-of-sight vehicle information retaining unit 3_4 of the first vehicle a10.

The collision avoidance system 1 mounted in the second vehicle A that has received the communication packet PE from the first vehicle a10 obtains location information on the first vehicle a10 or the like, on the basis of the information a10_inf on the first vehicle a10 included in the communication packet PE, and obtains a vehicle type of the vehicle B being present beyond the line of sight of the second vehicle A, a distance between the vehicle B and the first vehicle a10, and a speed of the vehicle B, on the basis of the information B_inf on the vehicle B.

Figure 10:
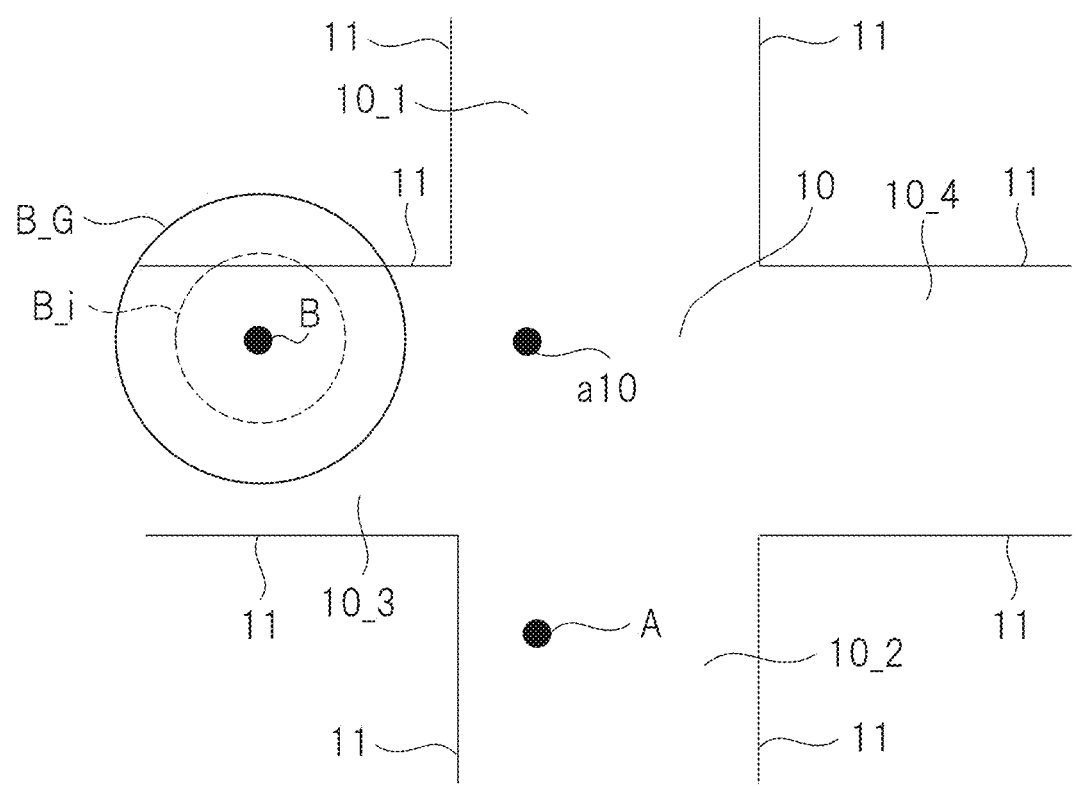

Next, a description regarding location information according to the communication packet from the vehicle B and location information on the vehicle B according to the information B_inf included in the communication packet from the first vehicle a10 will be given with reference to the drawing. FIG. 10 is a diagram describing the collision avoidance system according to the second embodiment. FIG. 10 is similar to FIG. 8. A difference between FIG. 10 and FIG. 8 is that each vehicle is depicted with a point in order to easily imagine a position of each vehicle in FIG. 10. Moreover, in FIG. 10, a circle B_G of a solid line surrounding the vehicle B indicates a range of a location of the vehicle B, the range obtained by adding error information to coordinates of the GNSS transmitted by the vehicle B in vehicle-to-vehicle communication. In contrast, a circle B_i of dashed lines surrounding the vehicle B indicates a range of a location of the vehicle B, the range obtained by adding error information to coordinates resulting from calculation based on a distance between the vehicle B and the subject vehicle (first vehicle a10) detected by the periphery monitoring system 2 of the first vehicle a10. That is, the range of the circle of the dashed lines is a range of the location of the vehicle B which is represented by the information B_inf. In this manner, the range of the circle of the dashed lines is inside the range of the circle of the solid line. Hence, a detection accuracy of the location of the vehicle B by the periphery monitoring system 2 is higher than a detection accuracy of the location of the vehicle B obtained by the GNSS. Thus, the second vehicle A can recognizes the location of the vehicle B with the information B_inf included in the communication packet transmitted from the first vehicle a10 with high accuracy.

Figure 11:
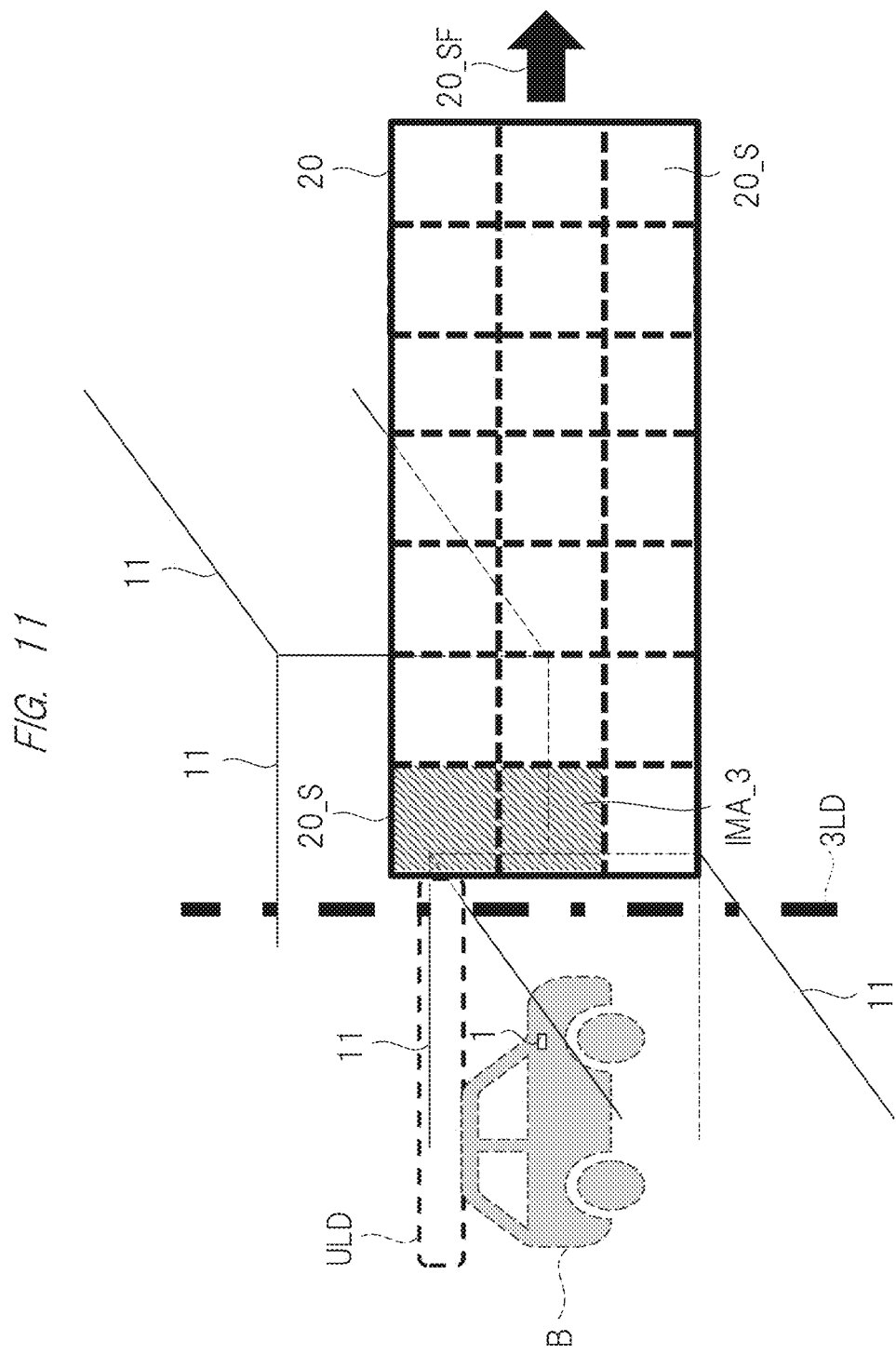

FIG. 11 is a diagram describing the collision avoidance system according to the second embodiment. In FIG. 11, a detection range 20 of the periphery monitoring system 2 of the second vehicle A is shown. FIG. 11 is similar to FIG. 3. A difference between FIG. 11 and FIG. 3 is that, in FIG. 11, a right end of the detection range 20 of the periphery monitoring system 2 is shifted in a direction indicated with an arrow 20_SF on the right side. Note that, in FIG. 11, a one-dot chain line 3LD indicates a left-end position of the detection range 20 shown in FIG. 3.

The second vehicle A can grasp the location of the vehicle B more accurately since the second vehicle A calculates the coordinates on the basis of the information B_inf of the vehicle B detected by the periphery monitoring system 2 of the first vehicle a10. Accordingly, the detection range 20 of the periphery monitoring system 2 of the second vehicle A can be shifted to the right side as shown in FIG. 11. That is, it is possible to shift in the rightward direction, a range in which image processing is carried out, the range of the video captured by the camera 2_1 mounted in the periphery monitoring system 2 of the second vehicle A. By shifting the detection range 20 in the rightward direction, it is possible to detect a vehicle, a person, or the like entering from the right side and avoid a collision. That is, in the second vehicle A, it becomes possible to control the detection range of the periphery monitoring system 2 of the second vehicle A such that the second vehicle A detects not only the vehicle B but also other regions (region on the right side).

Moreover, since the information B_inf includes information regarding the vehicle type of the vehicle B, according to the information of the vehicle type, the focused detection range IMA_3 detected by the periphery monitoring system 2 of the second vehicle A may be changed. Further, the information B_inf includes distance information between the first vehicle a10 and the vehicle B and information on the exterior shape of the vehicle B, which are obtained on the basis of the video captured by the camera 21 of the periphery monitoring system 2 of the first vehicle a10. Accordingly, for example, even if the vehicle B is a vehicle type that has newly been sold, or even if the vehicle B has a load ULD which is not included in the information on the vehicle type, the second vehicle A can set the focused detection range IMA_3 by use of the information on the exterior shape on the vehicle B and the distance information included in the information B_inf. In the example indicated in FIG. 11, a case in which the load ULD projecting further than the vehicle B is mounted on the vehicle B is shown. The periphery monitoring system 2 of the first vehicle a10 detects a distance between the load ULD of the vehicle B and the subject vehicle (first vehicle a10) and the information on the exterior shape of the vehicle B including the load ULD. The periphery monitoring system 2 of the second vehicle A can narrow down the focused detection range IMA_3 on the basis of the information A_inf (FIG. 9) on the first vehicle a10 transmitted from the first vehicle a10 and the information B_inf on the vehicle B including the load ULD. The focused detection range IMA_3 shown in FIG. 11 is made narrower than the focused detection range IMA_1 shown in FIG. 3, and set to the left upper side of the detection range 20 such that the load ULD projecting further than the vehicle B is focused on. By making the focused detection range IMA_3 narrower, a frequency of image processing to be carried out in the focused detection range IMA_3 is made higher, so that the vehicle B can be detected in a shorter time.

In this case, when a location accuracy of the GNSS mounted in the vehicle B is lower than a location accuracy of the vehicle B detected by the periphery monitoring system 2 of the first vehicle a10, a case in which the information regarding the vehicle B detected by the periphery monitoring system 2 of the first vehicle a10 is used by the second vehicle A to avoid a collision has been described. However, even in a case in which the location accuracy of the GNSS mounted in the vehicle B is relatively high, it can be considered that, in a case in which there are high buildings, an overhead bridge, and the like in the vicinity of a crossroads such as the crossroads 10, the location accuracy of the GNSS mounted in the vehicle B is deteriorated. Consequently, the location accuracy of the GNSS may be lowered without any relation to the location accuracy of the GNSS mounted in the vehicle B.

In this case, a map of an automotive navigation system mounted in the vehicle or a map that is in communication with the vehicle via the approaching vehicle notifying system 3 or the like is retained in the collision avoidance system 1 of the second vehicle A as peripheral information of the second vehicle A, and by making use of this map, the second vehicle A may change the focused detection range IMA_3. That is, with reference to the retained map, the collision avoidance system 1 of the vehicle A determines that, in a case in which there is a crossroads or the like in the periphery thereof, the location accuracy of the GNSS becomes lower, and may make the focused detection range IMA_3 wider. In addition, as has been described in FIG. 7 to FIG. 10, with reference to the retained map, when there is a crossroads or the like in the periphery of the vehicle A, the collision avoidance system 1 of the vehicle A may set the focused detection range IMA_3 in order to detect the vehicle B in a short time, with use of the information B_inf on the vehicle B transmitted from another vehicle.

In addition, a case in which the communication quality of vehicle-to-vehicle communication is deteriorated by being disturbed by the buildings or the like, making it difficult to transmit the location information of the GNSS in the vehicle-to-vehicle communication in a short time can also be considered. Also in this case, with reference to the retained map, at the crossroads or the like, for example, the focused detection range IMA_3 may be made wider.

In FIG. 8 and FIG. 10, a case in which all the vehicles A, B, and a10 have the collision avoidance system 1 shown in FIG. 7 mounted therein has been described, but the present invention is not limited to this. For example, in a case in which there is a vehicle not having the collision avoidance system 1 mounted therein between the vehicle B and the first vehicle a10, this vehicle not having the collision avoidance system 1 mounted therein is detected by the periphery monitoring system 2 of the first vehicle a10. The first vehicle a10 may notify the second vehicle A of information on the vehicle detected by the periphery monitoring system 2 thereof, as beyond-line-of-sight vehicle information 4OT, via vehicle-to-vehicle communication, regardless of the communication target information 4CT of the second vehicle A. This notification enables the second vehicle A to obtain the information on the vehicle not having the collision avoidance system 1 mounted therein, and further, the second vehicle A can set the focused detection range IMA_3.

According to the collision avoidance system 1 of the second embodiment, the detected vehicle comparison/determination system 4 includes the beyond-line-of-sight vehicle determining unit 4_1, and transmits the beyond-line-of-sight vehicle information 4OT to another vehicle, by use of the approaching vehicle notifying system 3. Anther vehicle can grasp the location of the vehicle being present beyond the line of sight by the beyond-line-of-sight vehicle information 4OT with high accuracy and can grasp the shape of the vehicle. As such, it is possible to detect a vehicle that needs to avoid a possible collision in a short time, so that an action for collision avoidance can smoothly be carried out.

Third Embodiment

In the third embodiment, the detected vehicle comparison/determination system of the periphery monitoring system includes a beyond-line-of-sight vehicle determining unit and a line-of-sight vehicle determining unit, and a collision avoidance system that transmits both beyond-line-of-sight vehicle information and line-of-sight vehicle information to other vehicles in vehicle-to-vehicle communication is provided.

Figure 12:
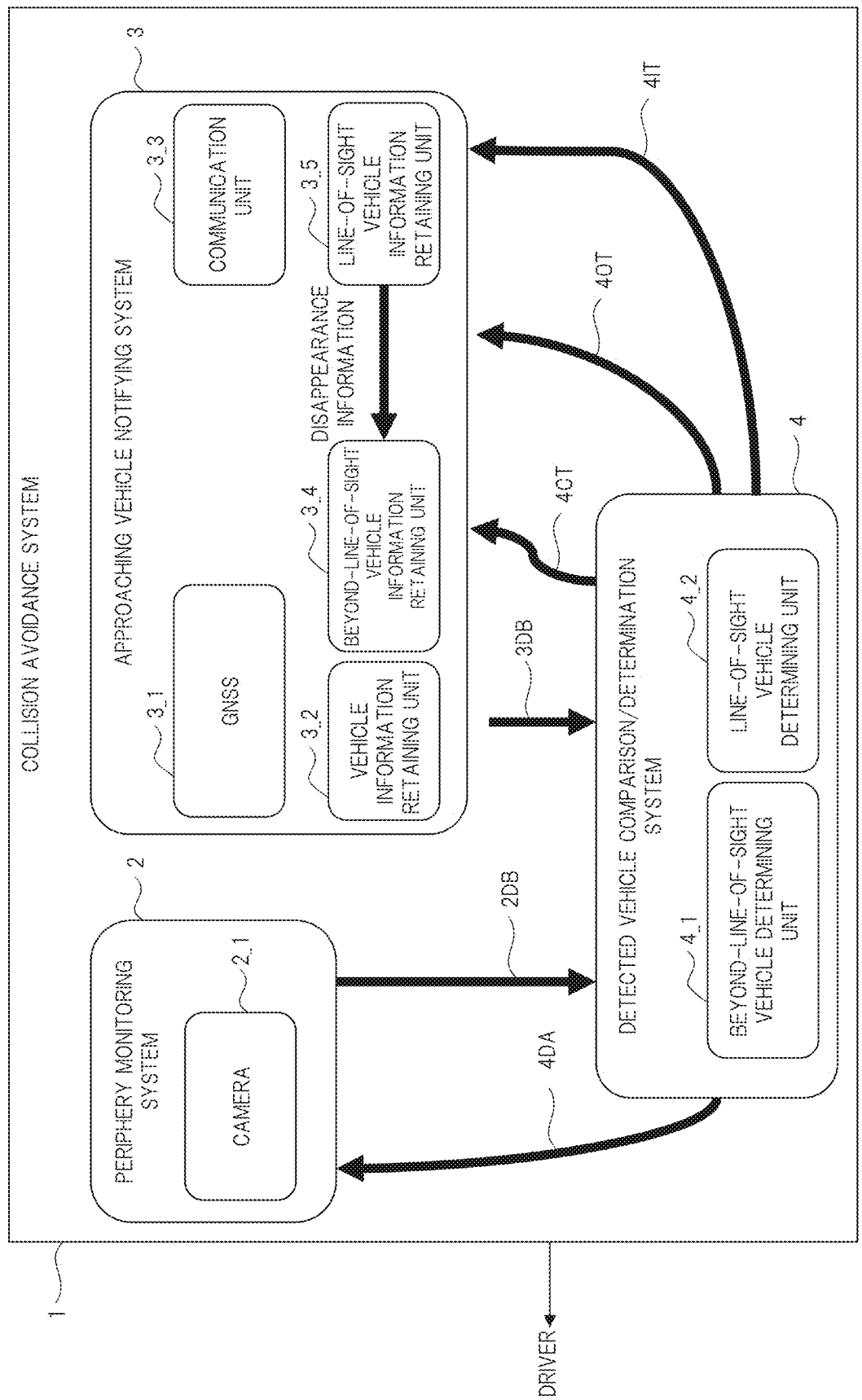

FIG. 12 is a block diagram showing a configuration of a collision avoidance system according to the third embodiment. Since FIG. 12 is similar to FIG. 7, differences between FIG. 12 and FIG. 7 will mainly be described. First difference is that, in FIG. 12, the detected vehicle comparison/determination system 4 includes not only the beyond-line-of-sight vehicle determining unit 4_1, but also a line-of-sight vehicle determining unit 4_2. Second difference is that, in FIG. 12, the approaching vehicle notifying system 3 includes not only the beyond-line-of-sight vehicle information retaining unit 3_4, but also a line-of-sight vehicle information retaining unit 3_5. The line-of-sight vehicle information retaining unit 3_5 retains the line-of-sight vehicle information output from the detected vehicle comparison/determination system 4 and outputs disappearance information to the beyond-line-of-sight vehicle information retaining unit 3_4.

Information on a vehicle being present in a line of sight of the subject vehicle, for example, the information such as a vehicle type of the vehicle, a distance between the vehicle and the subject vehicle, and a speed of the vehicle, is supplied to the beyond-line-of-sight vehicle determining unit 4_1 and the line-of-sight vehicle determining unit 4_2 as the detected vehicle information 2DB, from the periphery monitoring system 2. As has been described in the second embodiment, the beyond-line-of-sight vehicle determining unit 41 outputs the information on the vehicle detected by the approaching vehicle notifying system 3, as the beyond-line-of-sight vehicle information 4OT. The line-of-sight vehicle determining unit 4_2 outputs, as time passes, information on a vehicle that has not been detected by the periphery monitoring system 2, that is, a vehicle that has disappeared in a line of sight of the subject vehicle, as line-of-sight vehicle information 4IT. For example, in a case in which a vehicle that was present within a predetermined distance from the subject vehicle has disappeared in the line of sight of the subject vehicle, the line-of-sight vehicle determining unit 4_2 outputs information on the vehicle as the line-of-sight vehicle information 4IT. The beyond-line-of-sight vehicle information 4OT is retained in the beyond-line-of-sight vehicle information retaining unit 3_4 of the approaching vehicle notifying system 3, and the line-of-sight vehicle information 4IT is retained in the line-of-sight vehicle information retaining unit 3_5. The information on the vehicle that has disappeared in the line of sight of the subject vehicle, the information being retained in the line-of-sight vehicle information retaining unit 3_5, is supplied to the beyond-line-of-sight vehicle information retaining unit 3_4 and is retained also in the beyond-line-of-sight vehicle information retaining unit 3_4. Note that, in the following description, the information on the vehicle that has disappeared in the line of sight of the subject vehicle is referred to as disappearance information.

The approaching vehicle notifying system 3 performs vehicle-to-vehicle communication with the approaching vehicle notifying system 3 mounted in each of other vehicles. At this time, the approaching vehicle notifying system 3 adds the information on vehicles retained in the beyond-line-of-sight vehicle information retaining unit 3_4 to the information on the subject vehicle retained in the vehicle information retaining unit 3_2 to transmit the information to the other vehicles. That is, the approaching vehicle notifying system 3 transmits the information obtained by adding the beyond-line-of-sight vehicle information 4OT and the disappearance information to the information on the subject vehicle as the subject vehicle information.

Operation of Collision Avoidance System

Figure 13:
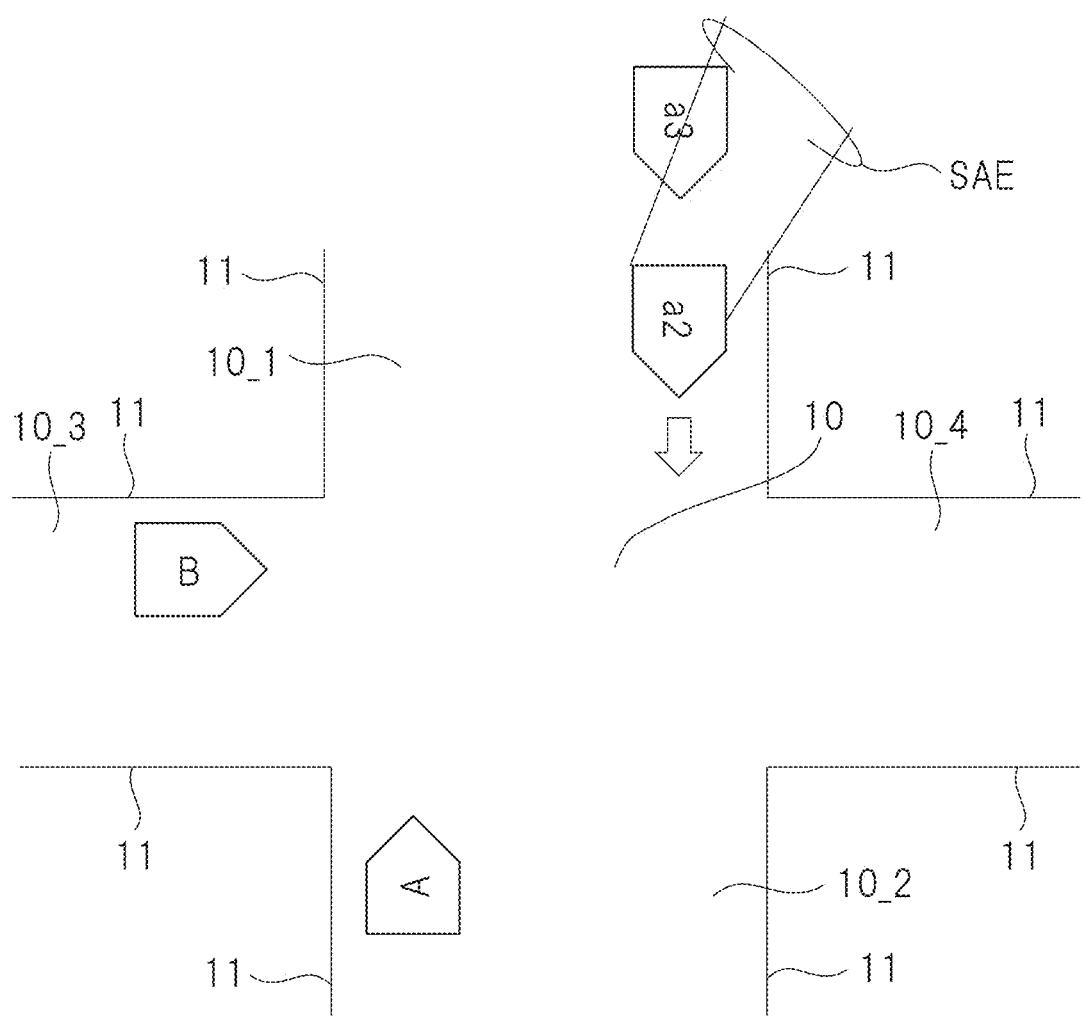
Figure 14:
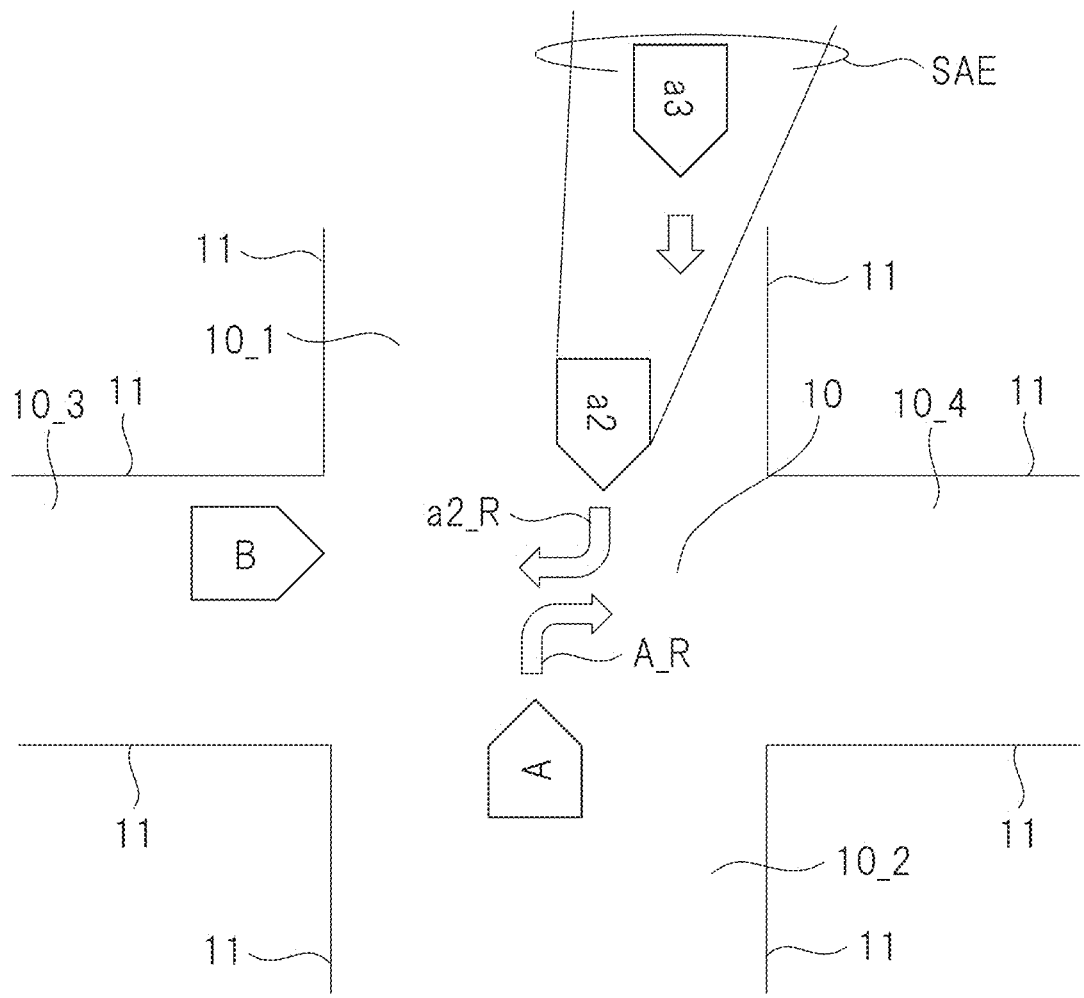

Next, operation of the collision avoidance system according to the third embodiment will be described with reference to the drawings. FIG. 13 and FIG. 14 are diagrams each describing the collision avoidance system according to the third embodiment.

First, a travelling state to be used for description is provided. In FIG. 13, it is assumed that the vehicle A travelling from the road 10_2 toward the crossroads 10 as the subject vehicle (first vehicle). In contrast, the vehicle a2 and the vehicle a3 (second vehicle or another vehicle) travel so as to head from the road 10_1 toward the crossroads 10 in a platoon. Also, the vehicle B travels heading from the road 10_3 to the crossroads 10.

The vehicle B is obscured by the wall 11, and accordingly, is not detected by the periphery monitoring system 2 of the first vehicle A. That is, the vehicle B is present beyond the line of sight of the first vehicle A. In contrast, the vehicle a2 and the second vehicle a3 are present in the line of sight of the first vehicle A, and accordingly, is detected by the periphery monitoring system 2 of the first vehicle A. Here, a range indicated by a reference signs SAE indicates an area being a shadow behind the vehicle a2, when the vehicle a2 is viewed from the first vehicle A. In a state indicated in FIG. 13, part of the second vehicle a3 is out of the shadow area SAE, and accordingly, the second vehicle a3 is present in the line of sight of the first vehicle A. In such a state, the vehicle a2 and the second vehicle a3 are detected by the periphery monitoring system 2 of the collision avoidance system 1 of the first vehicle A. Information regarding the vehicle a2 and the second vehicle a3 thus detected are output to the approaching vehicle notifying system 3 as the beyond-line-of-sight vehicle information 4OT, via the detected vehicle comparison/determination system 4. The approaching vehicle notifying system 3 of the collision avoidance system 1 of the first vehicle A transmits the supplied information regarding the vehicle a2 and the second vehicle a3, along with the information on the first vehicle A, to a vehicle being present in the periphery of the first vehicle A in vehicle-to-vehicle communication.

As has been described in FIG. 6 of the first embodiment, the first vehicle A continues vehicle-to-vehicle communication, only with a vehicle being present beyond the line of sight (in FIG. 13, only the vehicle B). Since the vehicle-to-vehicle communication in this case is performed between the two vehicles, it becomes possible to keep the communication interval between the first vehicle A and the vehicle B short, and the information on the vehicle B that needs to avoid a possible collision can be detected in a short time.

Next, a case in which the first vehicle A and the vehicle a2 enter the crossroads 10 and each turn right will be described. FIG. 14 shows the states at this time. That is, it is assumed that the vehicle a2 turns right in a direction indicated with an arrow a2_R and the first vehicle A turns right in a direction indicated with an arrow A_R at the crossroads 10 and each of the vehicles a2 and A then travels straight ahead. In the state shown in FIG. 14, the second vehicle a3 is present at a left rearward position of the vehicle a2, and the entire body thereof is in the shadow area SAE of the vehicle a2. Hence, in a case in which the second vehicle a3 is viewed from the first vehicle A, a state of the second vehicle a3 is changed from a state to be present in the line of sight of the first vehicle A to a state to be present beyond the line of sight of the first vehicle A. That is, when the second vehicle a3 is viewed from the periphery monitoring system 2 of the first vehicle A, the state of the second vehicle a3 is changed from the line-of-sight state to a disappearing state. The line-of-sight vehicle determining unit 4_2 of the first vehicle A compares the detected vehicle information 2DB output by the periphery monitoring system 2 with the detected vehicle information 2DB that has been output right before the output, to detect a vehicle that has changed its state from the line-of-sight state to the beyond-line-of-sight state. The line-of-sight vehicle determining unit 4_2 of the first vehicle A determines whether or not a distance between the vehicle that has changed its state to the beyond-line-of-sight state when has been detected lastly in the line of sight of the first vehicle A and the first vehicle A is within a predetermined distance. Then, the line-of-sight vehicle determining unit 4_2 of the first vehicle A identifies the second vehicle a3 as a disappearing vehicle. Note that, in a case in which the line-of-sight vehicle determining unit 4_2 of the first vehicle A detects a plurality of vehicles that change their states to the beyond-line-of-sight states, the vehicle having a shortest inter-vehicle distance when it has been in the line-of-sight state may be identified as the disappearing vehicle. The information on the second vehicle a3 is retained, as disappearance information representing disappearance of the vehicle, in the beyond-line-of-sight vehicle information retaining unit 3_4 of the first vehicle A.

Figure 15:
FIG. 15 is a diagram showing a configuration of a communication packet according to the third embodiment.

FIG. 15 is a diagram showing a configuration of a communication packet according the third embodiment. FIG. 15 is similar to FIG. 9. FIG. 15 shows a communication packet PF transmitted by the first vehicle A, where A_inf indicates the information on the first vehicle A and S_inf indicates disappearance information. The disappearance information S_inf has, for example, a time at which the second vehicle a3 has been detected lastly in the line of sight of the first vehicle A, a distance between the first vehicle A and the second vehicle a3, and a vehicle type (or a shape) of the second vehicle a3 at this time included therein.

The second vehicle a3 receives the communication packet PF transmitted by the first vehicle A. The approaching vehicle notifying system 3 of the collision avoidance system 1 of the second vehicle a3 recognizes that the information of the first vehicle A includes the subject vehicle a3 as the disappearance information and determines that the second vehicle a3 becomes a vehicle that is beyond the line of sight of the first vehicle A. Accordingly, the second vehicle a3 restarts vehicle-to-vehicle communication with the approaching vehicle notifying system 3 of the first vehicle A. Hence, the first vehicle A and the second vehicle a3 can confirm the locations with each other in the respective approaching vehicle notifying systems 3. In addition, the approaching vehicle notifying system 3 of the first vehicle A sets the second vehicle a3 as the disappearing vehicle to be the most carefully watched vehicle of the beyond-line-of-sight vehicles, on the basis of the disappearance information retained in the line-of-sight vehicle information retaining unit 3_5, and a communication frequency with the second vehicle a3 may be increased.

Also, as has been described in the first embodiment, the periphery monitoring system 2 of the first vehicle A can set the focused detection range by use of the detection area information 4DA output by the detected vehicle comparison/determination system 4. Accordingly, the detected vehicle comparison/determination system 4 focuses on the vehicle information of the second vehicle a3 as the disappearing vehicle, of the vehicle information of the detected vehicle information 3DB obtained by the approaching vehicle notifying system 3, to generate the detection area information 4DA.

Figure 16:
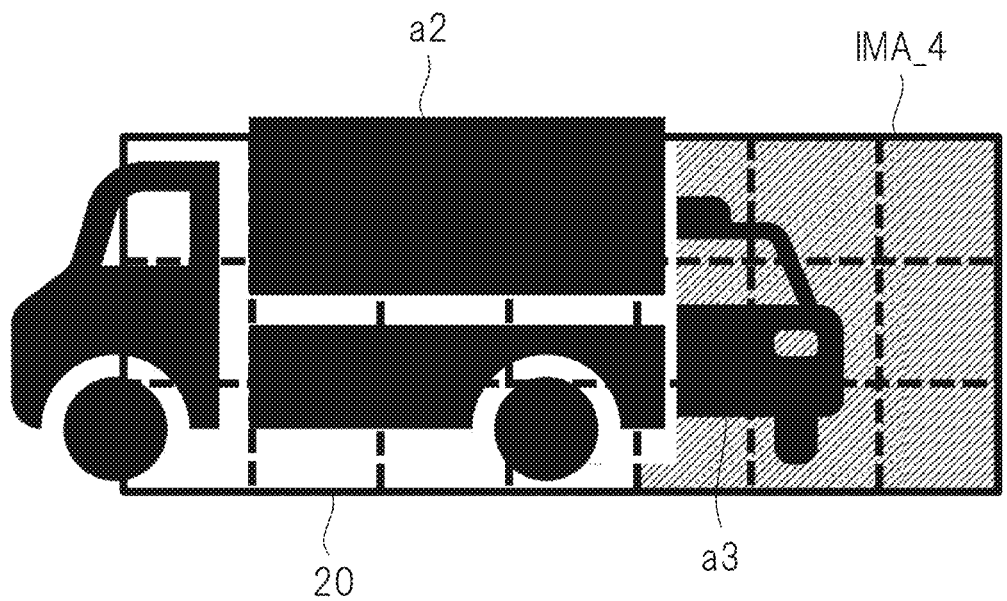
FIG. 16 is a diagram describing the collision avoidance system according to the third embodiment.

An example of this setting will be described with reference to the drawing. FIG. 16 is a diagram describing the collision avoidance system according to the third embodiment. As has been shown in FIG. 16, the collision avoidance system 1 of the first vehicle A sets a focused detection range IMA_4 indicated in oblique lines on the right side of the vehicle a2 crossing in front of the first vehicle A, on the basis of the location information on the second vehicle a3 obtained via vehicle-to-vehicle communication. Thus, in preparation for appearance of the second vehicle a3, the periphery monitoring system 2 of the first vehicle A is controlled, so that a detection range of appearance of the second vehicle a3 can be processed in a short time. As a result, it is possible to detect the second vehicle a3 in a short time.

In FIG. 12 to FIG. 16, a case in which the vehicle (a3) moves to the shadow area SAE of another vehicle (a2), is then changed from the line-of-sight state to the beyond-line-of-sight state, and cannot be detected by the periphery monitoring system has been described, but the present invention is not limited to this.

For example, also in a case in which the sunlight in front of the first vehicle A lowers the detection sensitivity of the camera 2_1 or a case in which presence of a vehicle or a building having a large area that interrupts a radar in a front direction causes deterioration of the detection sensitivity of the radar, it can be considered that the second vehicle a3 cannot be detected by the periphery monitoring system 2. Also in these cases, the second vehicle a3 considers that the state thereof is changed from the line-of-sight of the subject vehicle A to the beyond-line of sight of the subject vehicle A, and vehicle-to-vehicle communication between the second vehicle a3 and the first vehicle A may be restarted. Note that deterioration of the detection sensitivity due to the sunlight and the building constantly occurs regardless of presence of the vehicle a2, and hence, the map of the automotive navigation system mounted in the vehicle or the map that is in communication with other vehicles via the approaching vehicle notifying system or the like is retained as peripheral information in the approaching vehicle notifying system of the vehicle, so that it may be configured such that a vehicle passing a crossroads uses this map.

According to the third embodiment, the information on the disappearing vehicle is transmitted to another vehicle by use of the approaching vehicle notifying system, the location of the vehicle whose state is changed from the line-of-sight state to the beyond-line-of-sight state can be grasped with high accuracy. Hence, it is possible to detect the vehicle that needs collision avoidance in a short time and smoothly perform a collision avoidance action.

In the foregoing, the invention made by the inventor of the present invention has been concretely described based on the embodiments. However, it is needless to say that the present invention is not limited to the foregoing embodiments and various modifications and alterations can be made within the scope of the present invention.

What is claimed is:
1. A collision avoidance system comprising:
   a periphery monitoring system which detects a first set of vehicles in proximity to a subject vehicle by use of a sensor;
   an approaching vehicle notifying system which detects a second set of vehicles including another vehicle in proximity to the subject vehicle and communicates with the second set of vehicles in vehicle-to-vehicle communication; and a detected vehicle comparison/determination system which is connected to the periphery monitoring system and the approaching vehicle notifying system, compares the detected first set of vehicles and the detected second set of vehicles, determines whether a vehicle that is detected only by approaching vehicle notifying system is present based on the comparison, and controls the periphery monitoring system and the approaching vehicle notifying system based on the determination.

2. The collision avoidance system according to claim 1, wherein the periphery monitoring system set part of a detection range of the sensor as a focused detection range, on the basis of the vehicle information on the vehicle detected only by the approaching vehicle notifying system, and increases a frequency of processing on output of the sensor in the focused detection range.

3. The collision avoidance system according to claim 1, wherein the detected vehicle comparison/determination system controls the approaching vehicle notifying system such that the communication with the vehicle detected only by the approaching vehicle notifying system is performed.

4. The collision avoidance system according to claim 3, wherein the detected vehicle comparison/determination system controls the periphery monitoring system so as to detect the vehicle detected only by the approaching vehicle notifying system.

5. The collision avoidance system according to claim 1, wherein the detected vehicle comparison/determination system transmits information on a vehicle detected by the periphery monitoring system to the approaching vehicle notifying system, and
wherein the approaching vehicle notifying system transmits, to the another vehicle, subject vehicle information, and further transmits, when information of the vehicle detected only by a approaching vehicle notifying system of the another vehicle is received information detected by the periphery monitoring system of the vehicle detected only by the approaching vehicle notifying system of the another vehicle.

6. The collision avoidance system according to claim 3, wherein the approaching vehicle notifying system transmits information on a disappearing vehicle that has not been detected by the periphery monitoring system.

7. The collision avoidance system according to claim 1, wherein the approaching vehicle notifying system is configured to obtain the information from the vehicle detected only by the approaching vehicle notifying system in a short interval.

8. A vehicle equipped with a collision avoidance system, the collision avoidance system including:
a periphery monitoring system which detects a first set of vehicles in proximity to a subject vehicle by use of a sensor;
an approaching vehicle notifying system which detects a second set of vehicles including another vehicle in proximity to the subject vehicle and communicates with the second set of vehicles in vehicle-to-vehicle communication; and
a detected vehicle comparison/determination system which is connected to the periphery monitoring system and the approaching vehicle notifying system, compares the detected first set of vehicles and the detected second set of vehicles, determines whether a vehicle that is detected only by approaching vehicle notifying system is present based on the comparison, and controls the periphery monitoring system and the approaching vehicle notifying system based on the determination.

9. The vehicle according to claim 8, wherein the detected vehicle comparison/determination system controls the periphery monitoring system so as to detect the vehicle detected only by the approaching vehicle notifying system.

10. The vehicle according to claim 8, wherein the detected vehicle comparison/determination system controls the approaching vehicle notifying system so as to communicate with the vehicle detected only by the approaching vehicle notifying system.

11. The vehicle according to claim 8, wherein the detected vehicle comparison/determination system causes the approaching vehicle notifying system to transmit, when information of a vehicle detected only by approaching vehicle notifying system of the another vehicle is received, information detected by the periphery monitoring system of the vehicle detected only by approaching vehicle notifying system of the another vehicle, to the another vehicle.

12. The vehicle according to claim 8, wherein the approaching vehicle notifying system transmits information on a disappearing vehicle that has not been detected by the periphery monitoring system.

13. The vehicle according to claim 8, wherein the approaching vehicle notifying system is configured to obtain the information from the vehicle detected only by the approaching vehicle notifying system in a short interval.

\* \* \* \* \*